United States Patent
Raghavan et al.

[19]

[11] Patent Number: 6,007,450
[45] Date of Patent: Dec. 28, 1999

[54] FIVE SPEED PLANETARY TRANSMISSION

[75] Inventors: Sekhar Raghavan; Kumaraswamy V. Hebbale; Patrick Benedict Usoro, all of Troy, Mich.

[73] Assignee: General Motors Corporation, Detroit, Mich.

[21] Appl. No.: 09/175,701

[22] Filed: Oct. 20, 1998

[51] Int. Cl.$^6$ .................................................. F16H 3/44
[52] U.S. Cl. ..................... 475/286; 475/271; 475/280; 475/319; 475/325
[58] Field of Search ........................ 475/269, 271, 475/280, 286, 287, 296, 317, 319, 323, 325

[56]  References Cited

U.S. PATENT DOCUMENTS

| | | | |
|---|---|---|---|
| 3,946,623 | 3/1976 | Murakami et al. | 475/280 X |
| 4,483,215 | 11/1984 | Ishimaru et al. | 475/280 X |
| 4,872,376 | 10/1989 | Asada et al. | 475/281 |
| 5,030,186 | 7/1991 | Asada | 475/285 X |
| 5,059,162 | 10/1991 | Otsuka | 475/276 |
| 5,073,160 | 12/1991 | Oshidari | 475/281 |
| 5,141,477 | 8/1992 | Oshidari | 475/319 X |
| 5,165,308 | 11/1992 | Asada et al. | 475/276 X |
| 5,194,055 | 3/1993 | Oshidari | 475/280 X |
| 5,567,201 | 10/1996 | Ross | 475/280 |
| 5,692,988 | 12/1997 | Beim et al. | 475/280 X |
| 5,716,298 | 2/1998 | Beim et al. | 475/281 X |
| 5,810,689 | 9/1998 | Park | 475/284 |
| 5,816,972 | 10/1998 | Park | 475/271 X |
| 5,823,910 | 10/1998 | Park | 475/271 |
| 5,830,102 | 11/1998 | Coffey | 475/285 |
| 5,853,345 | 12/1998 | Park | 475/271 X |

*Primary Examiner*—Rodney H. Bonck
*Assistant Examiner*—Scott Lund
*Attorney, Agent, or Firm*—George A. Grove

[57]  ABSTRACT

A powertrain has a planetary gear arrangement with a simple planetary gear set and a compound planetary gear set which are interconnected by a continuous drive connection and are controlled to provide five forward drive ratios, a reverse drive ratio and a neutral condition. A plurality of torque transmitting devices including four clutches and two brakes are engaged in combination of three for each drive ratio. Two of the torque transmitting devices are engaged during the lowest forward drive ratio, the reverse drive ratio and the neutral condition.

10 Claims, 6 Drawing Sheets

FIG. 1

| GEAR | 22 | 24 | 26 | 28 | 30 | 32 |
|---|---|---|---|---|---|---|
| REVERSE | | X | | X | | G |
| NEUTRAL | | O | | O | | |
| FIRST | | X | | X | G | |
| SECOND | | | X | X | X | |
| THIRD | | X | X | | X | |
| FOURTH | | | X | | X | X |
| FIFTH | X | | X | | | X |

FIG. 2

|  | OPTION 1 | OPTION 2 | OPTION 3 |
|---|---|---|---|
| FIRST GEAR RATIO | 2.87 | 2.93 | 3.07 |
| SECOND | 1.53 | 1.60 | 1.73 |
| THIRD | 1.00 | 1.00 | 1.00 |
| FOURTH | 0.71 | 0.69 | 0.65 |
| FIFTH | 0.57 | 0.55 | 0.51 |
| REV | 2.50 | 2.22 | 1.82 |
| 1-2 STEP SIZE | 1.87 | 1.83 | 1.77 |
| 2-3 | 1.53 | 1.60 | 1.73 |
| 3-4 | 1.40 | 1.45 | 1.55 |
| 4-5 | 1.25 | 1.26 | 1.27 |
| GEAR SET NO. 20 R/S | 1.87 | 1.83 | 1.77 |
| GEAR SET NO. 18 R/S | 2.50 | 2.22 | 1.82 |

| GEAR | 122 | 124 | 126 | 128 | 130 | 132 |
|---|---|---|---|---|---|---|
| REVERSE | G | | | X | | X |
| NEUTRAL | | | | O | | O |
| FIRST | | G | | X | | X |
| SECOND | | X | | X | X | |
| THIRD | | X | X | X | | |
| FOURTH | | X | X | | X | |
| FIFTH | | X | X | | | X |

FIG. 5

|  | OPTION 1 | OPTION 2 | OPTION 3 |
|---|---|---|---|
| FIRST GEAR RATIO | 2.88 | 3.00 | 3.10 |
| SECOND | 1.54 | 1.62 | 1.70 |
| THIRD | 1.00 | 1.00 | 1.00 |
| FOURTH | 0.71 | 0.69 | 0.67 |
| FIFTH | 0.57 | 0.56 | 0.55 |
| REV | 2.50 | 2.22 | 2.00 |
| 1-2 STEP SIZE | 1.87 | 1.85 | 1.82 |
| 2-3 | 1.54 | 1.62 | 1.70 |
| 3-4 | 1.40 | 1.45 | 1.50 |
| 4-5 | 1.25 | 1.23 | 1.22 |
| GEAR SET NO. 120 R/S | 2.15 | 2.35 | 2.55 |
| GEAR SET NO. 118 R/S | 2.50 | 2.22 | 2.00 |

| GEAR | 222 | 224 | 226 | 228 | 230 | 232 |
|---|---|---|---|---|---|---|
| REVERSE | X | | | | G | X |
| NEUTRAL | O | | | | | O |
| FIRST | X | | G | | | X |
| SECOND | | X | X | | | X |
| THIRD | X | X | | | | X |
| FOURTH | | X | | X | | X |
| FIFTH | | X | | X | X | |

FIG. 8

|  | OPTION 1 | OPTION 2 |
|---|---|---|
| FIRST GEAR RATIO | 2.88 | 3.22 |
| SECOND | 1.63 | 1.74 |
| THIRD | 1.00 | 1.00 |
| FOURTH | 0.67 | 0.67 |
| FIFTH | 0.43 | 0.46 |
| REV | 2.00 | 2.00 |
| 1-2 STEP SIZE | 1.77 | 1.85 |
| 2-3 | 1.63 | 1.74 |
| 3-4 | 1.50 | 1.50 |
| 4-5 | 1.53 | 1.45 |
| GEAR SET NO. 118 R/S | 2.00 | 2.00 |
| GEAR SET NO. 220 R/S | 1.63 | 1.74 |

FIVE SPEED PLANETARY TRANSMISSION

TECHNICAL FIELD

This invention relates to transmissions using planetary gear arrangements having two planetary gear sets and more particularly to such transmissions wherein the planetary gear arrangement has a simple planetary gear set and a compound planetary gear set.

BACKGROUND OF THE INVENTION

Automatic transmissions employ multi-speed planetary gear sets, controlled by friction clutches and brakes, to provide a plurality of gear ratios between the engine and final drive gearing, The number of ratios provided in passenger vehicles has increased from two forward ratios and one reverse ratio to five forward ratios and one reverse ratio. As the number of ratios increases, the number of planetary gear sets has increased.

Currently, the five speed transmissions available in passenger vehicles incorporate three planetary gear sets. It has been proposed in the art to use only two gear sets. Such devices are disclosed in pending U.S. Pat. Ser. No. 09/144,140 filed Aug. 31, 1998 and U.S. Pat. Ser. No. 09/179,756 filed Oct. 27, 1998 and in U.S. Pat. No. 5,879,264, which are assigned to the assignee of this application. Five speed arrangements incorporating two gear sets are also shown in U.S. Pat. Nos. 5,141,477; 5,567,201 and 5,692,988.

SUMMARY OF THE INVENTION.

It is an object of the present invention to provide an improved five speed transmission having two planetary gear sets.

In one aspect of the present invention, the transmission incorporates a simple planetary gear set and a compound gear set. In another aspect of the present invention, the two planetary gear sets are interconnected by a continuous drive connection between members of the gear sets.

In yet another aspect of the present invention, the two planetary gear sets are selectively interconnected by a selectively engageable clutch. In still another aspect of the present invention, the ring gear member of the simple planetary gear set is continuously connected with a transmission output shaft, and both the sun gear member and planetary carrier assembly member of the simple planetary gear set are individually connectable with an input shaft through selectively engageable clutches.

In a further aspect of the present invention, the planetary carrier assembly member of the compound planetary gear set is connectable with the input shaft through a selectively engageable clutch. In yet a further aspect of the present invention, both the ring gear member and the planetary carrier assembly member of the compound planetary gear set are selectively held stationary by selectively engageable brakes. In still a further aspect of the present invention, the ring gear member of the compound planetary gear set is selectively connectable with both the ring gear member of the simple planetary gear set and the output shaft.

2

DESCRIPTION OF EXEMPLARY EMBODIMENTS

Figure 1:
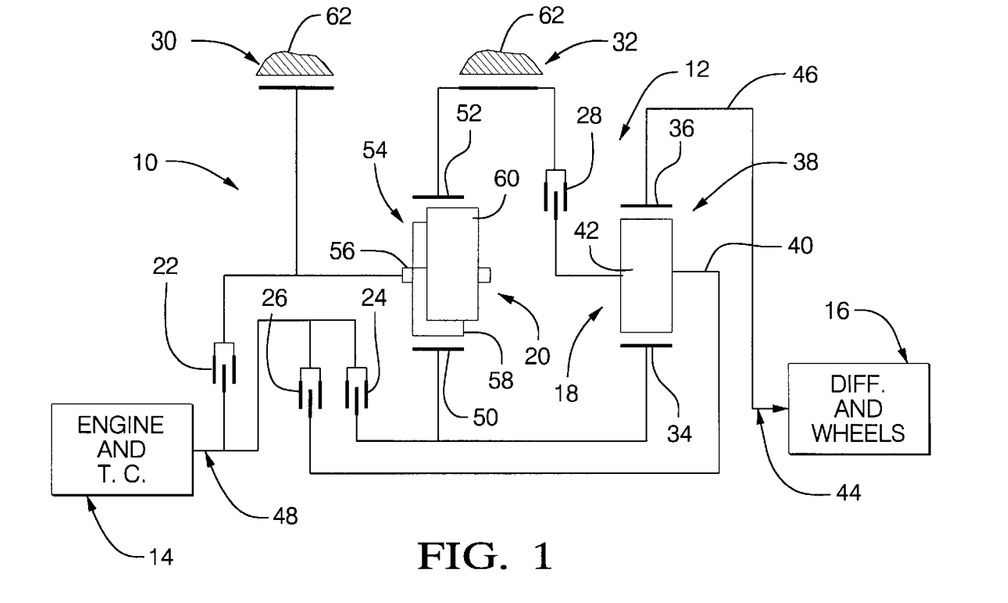
FIG. 1 is a schematic representation of a planetary gear arrangement incorporating one embodiment of the present invention.

A powertrain 10 incorporating a five speed planetary transmission or gear arrangement 12, an engine and torque converter 14 and a differential 16 is seen in FIG. 1. The transmission 12 has a simple planetary gear set 18, a compound planetary gear set 20, and a plurality of selectively engageable, fluid-operated torque transmitting mechanisms in the form of friction clutches 22, 24, 26, 28 and friction brakes 30, 32. The torque transmitting mechanism are conventional devices which are well known to those skilled in the art. They are engaged by fluid pressure to establish a friction torque transmitting connection between two components. In the case of the clutches 22, 24, 26 and 28, the torque transmitting connection is between rotatable members while the brakes 30 and 32 provide a torque transmitting connection between a rotatable member and a stationary member.

The engine and torque converter 14 and the differential 16 are also conventional devices which are well known in the art. The torque converter may include a torque converter clutch, if desired. The differential 16 may be incorporated in the transmission housing or at a separate location on the vehicle. The drive wheels, not shown, of the vehicle are connected through drive shafts, not shown, to the differential 16 in a well-known manner.

The simple planetary gear set 18 has a sun gear member 34, a ring gear member 36 and a planetary carrier assembly member 38. The planetary carrier assembly member 38 has a housing or spider 40 which rotatably mounts a plurality of pinion gears 42. The pinion gears 42 are disposed in meshing relation with both the sun gear member 34 and the ring gear member 36. The ring gear member 36 is continuously drivingly connected with an output shaft 44 through a hub 46; the shaft 44 in turn is connected to the differential 16. The sun gear member 34 is selectively connectable with an input shaft 48 through the clutch 24. The planetary carrier assembly member 38 is selectively connectable with the input shaft 48 through the clutch 26.

The compound planetary gear set 20 has a sun gear member 50, a ring gear member 52 and a planetary carrier assembly member 54. The planetary carrier assembly member 54 includes a housing or spider 56 on which are rotatably mounted intermeshing pinion gears 58 and 60 which also *mesh with the sun gear member 50 and ring gear member 52, respectively. The sun gear member 50 is continuously drivingly connected with the sun gear member 34 and is, therefore, selectively drivingly connectable with the input shaft 48 via the clutch 24. The ring gear member 52 is selectively connectable with a transmission housing 62 through the brake 32 and is also selectively connectable with the planetary carrier assembly member 38 through the clutch 28. The planetary carrier assembly member 54 is selectively connectable with the input shaft 48 through the clutch 22 and also selectively connectable with the housing 62 through the brake 30.

Figure 2:
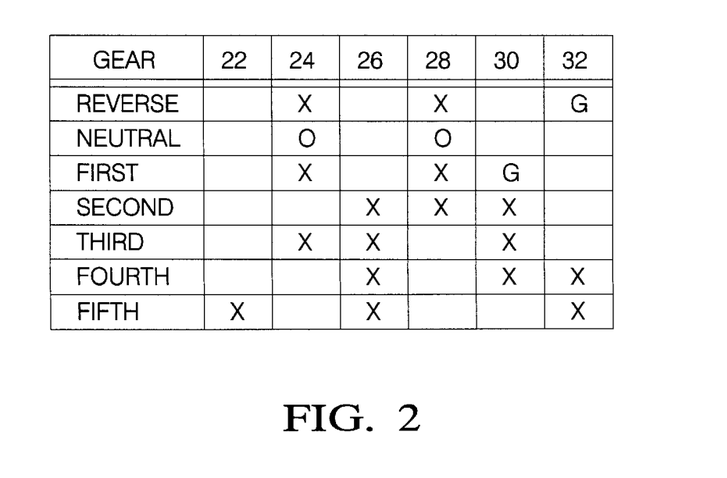
FIG. 2 is a truth table describing the engagement schedule of the friction devices used with the arrangement of FIG. 1.
Figure 3:
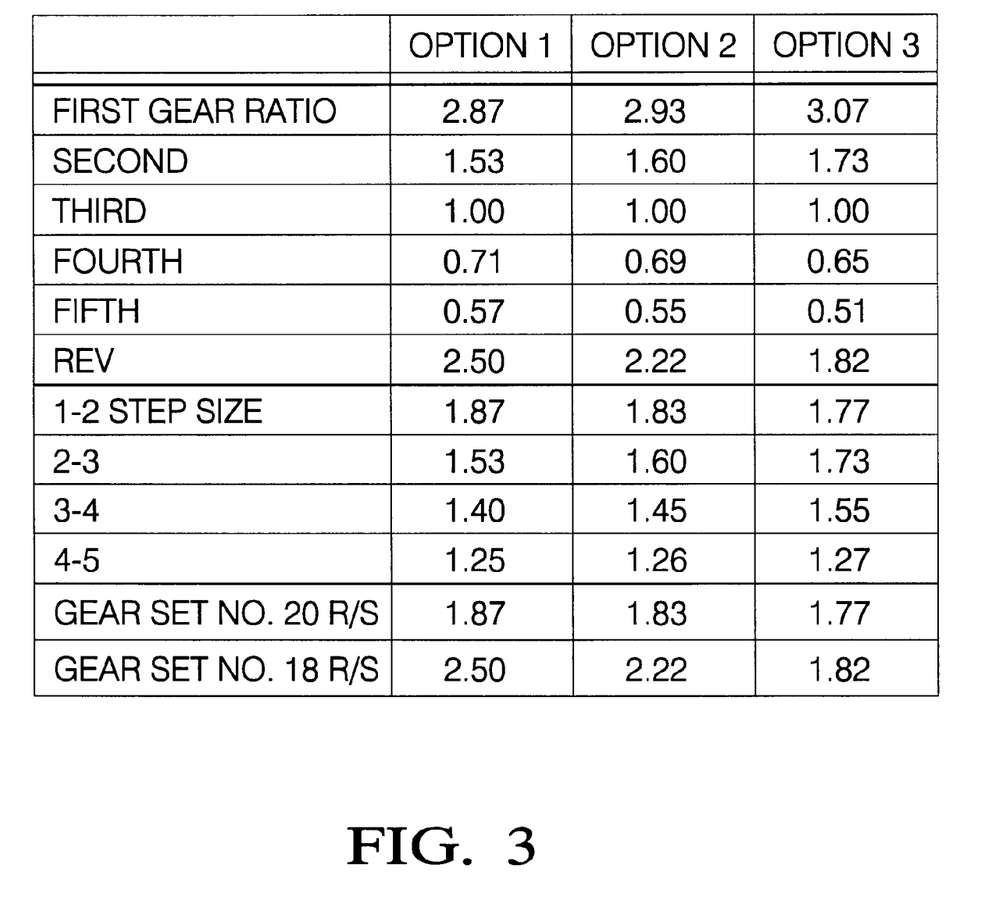
FIG. 3 is a chart of the ratios and step sizes attainable with various ring gear to sun gear tooth ratios in the two gear sets.

The clutches 22, 24, 26 and 28 and the brakes 30 and 32 are selectively controlled by a conventional hydraulic control mechanism or electro-hydralulic mechanism, not shown. The torque transmitting devices are engaged in combinations, as shown in FIG. 2, to provide five forward drive ratios, a neutral condition and a reverse drive ratio. As seen in the chart of FIG. 3, two of the forward drive ratios are underdrive ratios (input rotates faster than output), two of the forward ratios are overdrive ratios (output rotates faster than input) and one forward ratio is a direct ratio (input and output rotate at the same speed). In the truth tables shown in FIGS. 2, 5 and 8, "X" designates the friction device is engaged, "O" designates the friction device may be engaged or disengaged, and "G" designates the friction device is a "garage shift" friction device that is engaged to initiate vehicle launch.

The reverse drive ratio, the neutral condition and the first forward drive ratio have two of the same torque transmitting devices engaged, namely clutches 24 and 28. With only these two devices engaged, the planetary gear arrangement 12 does not have a torque path established between the input shaft 48 and the output shaft 44.

In the reverse drive ratio, the torque path is completed by the engagement of the brake 32. This establishes the planetary carrier assembly member 38 as a reaction member such that the reverse drive ratio is determined by the planetary gear set 18. To complete the torque path for the first forward drive ratio, the brake 30 is engaged. The planetary carrier assembly member 54 is established as the reaction member resulting in forward rotation of the planetary carrier assembly member 38. The sun gear member 34 is also driven forward. Due to the relative speeds of the planetary carrier assembly member 38 and sun gear member 34, the ring gear member 36 is driven forwardly. The first forward drive ratio is dependent on both planetary gear set 18 and planetary gear set 20.

The brakes 30 and 32 are applied to cause launching of the vehicle. These torque transmitting devices are engaged in a controlled manner, depending on operator demand, to smoothly engage their respective drive ratios. It should also be appreciated that the transmission 12 is changed from forward to reverse and vice versa with the interchange of only two devices and that the neutral condition is achieved without releasing all of the torque transmitting devices.

A single transition interchange from the first ratio to the second ratio is accomplished by the simultaneous engagement of clutch 26 and the disengagement of clutch 24. The planetary carrier assembly member 38 is driven at input speed and the sun gear member 34 is overdriven forwardly such that the ring gear member 36 is also driven forwardly at a ratio faster than in the first forward ratio. Both planetary gear set 18 and planetary gear set 20 are used during the establishment of the second forward ratio.

The ratio interchange from second to third is completed with the simultaneous engagement of clutch 24 and disengagement of clutch 28. This establishes the forward rotation of both the planetary carrier assembly member 38 and the sun gear member 34 to be equal to the speed of the input shaft 48. Thus, the planetary gear set 18 is placed in a direct drive condition wherein the ring gear member 36 and output shaft 44 are driven at input speed. The interchange from second ratio the third ratio and vice versa is a single transition shift.

The transmission ratio is interchanged from the third forward ratio to the fourth forward ratio with the simultaneous engagement of brake 32 and disengagement of clutch 24. This will hold the planetary gear set 20 stationary and establish the sun gear member 34 as the reaction member in the planetary gear arrangement 12. This establishes a classic overdrive condition in the planetary gear set 18 wherein the planetary carrier assembly member 38 is driven at input speed and the sun gear member 34 is stationary such that the output ring gear member 36 rotates faster than the input planetary carrier assembly member 38. This interchange is a single transition shift.

The fifth and highest forward drive ratio is established by the simultaneous engagement of clutch 22 and disengagement of the brake 30. This establishes the ring gear member 52 as the reaction member in the planetary gear arrangement 12 such that the sun gear member 50 is driven opposite to the input shaft 48 as is the sun gear member 34. Because of the speed relationship between the planetary carrier assembly member 38 and sun gear member 34, which are additive, the ring gear member is driven forwardly at a higher ratio than in the fourth ratio. Both planetary gear set 18 and planetary gear set 20 contribute to the fifth forward ratio.

The chart in FIG. 3 describes the various drive ratio values and step sizes between ratios for various tooth ratios of the ring gear member 36 to the sun gear member 34 and tooth ratios of the ring gear member 52 to the sun gear member 50. The drive ratio values are for input speed over output speed or, stated another way, the ratios are torque ratios. For example, the first forward ratio describes an input speed faster than an output speed, but the output torque is greater than the input torque. The opposite is true for the fourth and fifth forward ratios.

Figure 4:
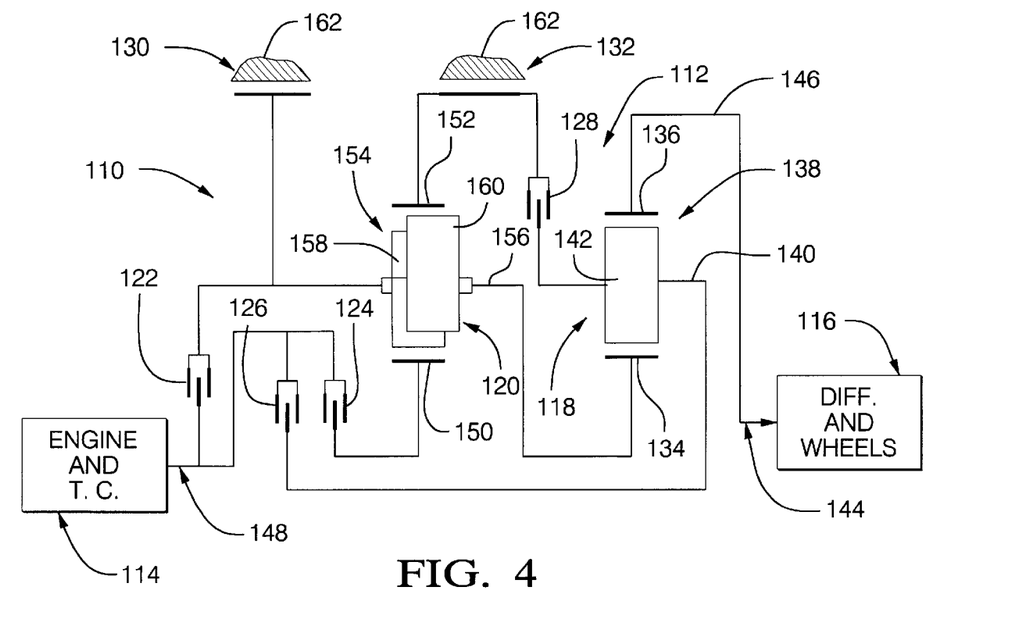
FIG. 4 is a schematic representation of a planetary gear arrangement incorporating another embodiment of the present invention.

FIG. 4 describes a powertrain 110 having a planetary transmission or gear arrangement 112, an engine and torque converter 114, and a differential 116. The planetary gear arrangement 112 has a simple planetary gear set 118, a compound planetary gear set 120, and a plurality of selectively engageable torque transmitting devices in the form of fluid-operated clutches 122, 124, 126 and 128 and fluid-operated brakes 130 and 132.

The simple planetary gear set 118 has a sun gear member 134, a ring gear member 136 and a planetary carrier assembly member 138 which includes a housing or spider 140 rotatably supporting a plurality of pinion gears 142. The pinion gears 142 are disposed in meshing relation with both the sun gear member 134 and the ring gear member 136. The ring gear member 136 is drivingly connected with an output shaft 144 through a hub 146. The sun gear member 134 is selectively connectable with an input shaft 148 through the clutch 122, and the planetary carrier assembly member 138 is selectively connectable with the input shaft through the clutch 126.

The compound planetary gear set 120 includes a sun gear member 150, a ring gear member 152 and a planetary carrier assembly member 154 which is comprised of a housing or spider 156 on which is rotatably mounted pairs of meshing pinion gears 158 and 160 disposed for meshing relation with sun gear member 150 and ring gear member 152, respectively. The sun gear member 150 is selectively connectable with the input shaft 148 through the clutch 124. The planetary carrier assembly member 154 is continuously drivingly connected with the sun gear member 134 and selectively to the input shaft 148 through the clutch 122. The planetary carrier assembly member 154 is also selectively connectable with a transmission housing 162 through the brake 130. The ring gear member 152 is selectively connectable with the transmission housing 162 through the brake 132 and selectively connectable with the planetary carrier assembly member 138 through the clutch 128.

Figure 5:
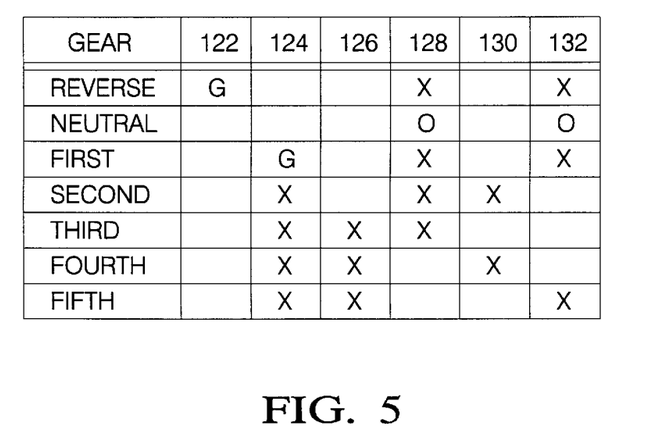
FIG. 5 is a truth table describing the engagement schedule of the friction devices used with the arrangement of FIG. 4.

The truth table of FIG. 5 describes the engagement combinations of the clutches 122, 124, 126 and 128 and the brakes 130 and 132 used to establish five forward drive ratios, a reverse drive ratio and a neutral condition. As should be apparent from the chart, the planetary gear arrangement provides two underdrive ratios, a direct drive ratio and two overdrive ratios. With the exception of the neutral condition, the torque transmitting devices are engaged in combinations of three. The planetary gear arrangement of FIG. 4 is similar to that of FIG. 1 in that the reverse drive ratio, the neutral condition and the first forward drive ratio have two of the same devices engaged, that is, clutch 128 and brake 132. To complete the reverse drive ratio, the clutch 122 is engaged. The brake 132 and clutch 128 establish the planetary carrier assembly member 138 as a reaction member and the clutch 122 completes the ratio by connecting the sun gear member 134 with the input shaft 148. As with the transmission 10, the reverse drive ratio of transmission 110 is provided by the simple planetary gear set 118 only.

The first forward ratio is completed with the engagement of the clutch 124. The ring gear member 152 provides a reaction member in the planetary gear set 120 while the planetary carrier assembly member 138 remains the reaction member for the planetary gear set 118. The planetary carrier assembly member 154 and therefore sun gear member 134 are driven in reverse at a reduced ratio. The relative speeds of the sun gear member 134 and planetary carrier assembly member 138 result in the forward rotation of the ring gear member 136 and therefore the output shaft 144. The first forward ratio is provided by both planetary gear set 118 and planetary gear set 120.

A single transition ratio interchange is provided between the first forward ratio and the second forward ratio with the simultaneous engagement of the brake 130 and disengagement of the brake 132. This establishes the planetary carrier assembly member 154 as the reaction member in the planetary gear set 120 such that the ring gear member 152 and planetary carrier assembly member 138 are driven forwardly at a reduced ratio depending on the gear sizes of the planetary gear set 120. The sun gear member 134 is the reaction member in the planetary gear set 118 such that the forward rotation of the planetary carrier assembly member 138 results in forward rotation of the ring gear member 136. While this combination of input/reaction members in planetary gear set 118 would normally suggest an overdrive ratio, the final ratio at the output shaft 144 is an underdrive ratio, due to the large reduction ratio at both the ring gear member 152 and planetary carrier assembly member 138.

The third forward ratio is established with a single transition interchange through the simultaneous engagement of the clutch 126 and disengagement of brake 130. The engagement of the three clutches 124, 126, and 128 establishes a direct drive in both planetary gear set 118 and planetary gear set 120.

A single transition interchange from the third forward ratio to the fourth forward ratio is accomplished with the simultaneous engagement of the brake 130 and disengagement of the clutch 128. This establishes the sun gear member 134 as the reaction member in the planetary gear set 118 and the planetary carrier assembly member 138 as the input member. As with the transmission 10, a classic overdrive is established in the simple planetary gear set 118.

The ratio interchange from the fourth forward ratio to the fifth forward ratio is accomplished with the single transition engagement of the brake 132 and simultaneous disengagement of the brake 130. This results in the reverse rotation of the planetary carrier assembly member 154 and the sun gear member 134. The reverse rotation of the sun gear member 134 is additive to the forward rotation of the planetary carrier assembly member 138 resulting in an increased speed ratio at the ring gear member 136 as compared to the fourth ratio.

Figure 6:
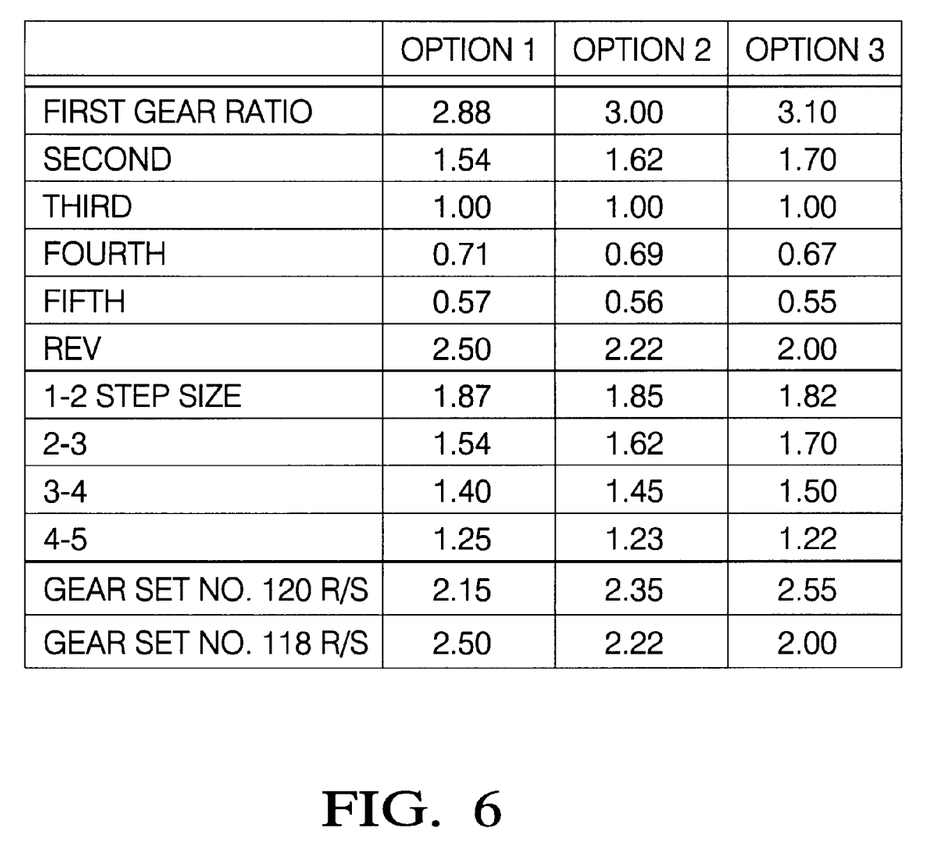
FIG. 6 is a chart of the ratios and step sizes attainable with various ring gear to sun gear tooth ratios in the two gear sets.

The chart in FIG. 6 defines the various ratios and step sizes for the planetary gear arrangement 112 when the ring gear/sun gear ratios of the planetary gear set 118 and planetary gear set 120 are as shown. It should be noted that the reverse ratio is the same as the ring gear member 136/sun gear member 134 ratio. It can also be shown that the fourth gear ratio is also dependent only on the ratio of the planetary gear set 118.

Figure 7:
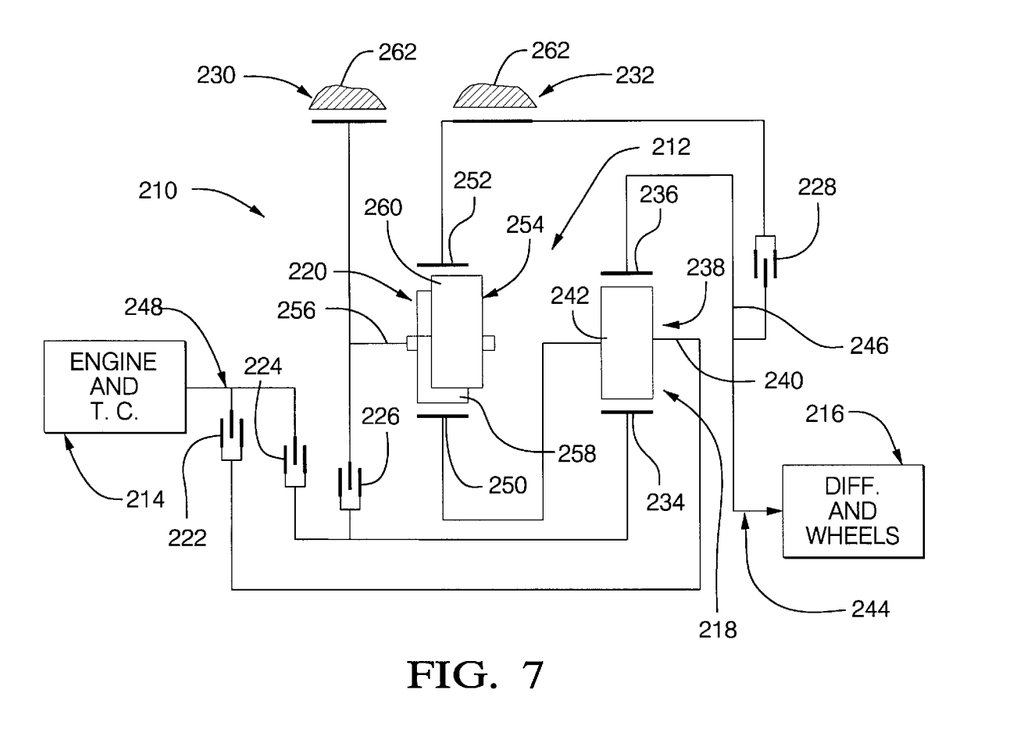
FIG. 7 is a schematic representation of a planetary gear arrangement incorporating a further embodiment of the present invention.

Referring to FIG. 7, there is seen a powertrain 210 which includes a planetary transmission or gear arrangement 212, an engine and torque converter 214, and a differential 216. The planetary gear arrangement 212 has a simple planetary gear set 218 and a compound planetary gear set 220. The planetary gear arrangement 212 provides five forward drive ratios, a neutral condition and a reverse drive ratio through the controlled engagement of a plurality of selectively engageable torque transmitting devices comprised of four clutches 222, 224, 226 and 228 and a pair of brakes 230 and 232. These torque transmitting devices are engaged in combinations of three devices during the establishment of the five forward drive ratios and the reverse drive ratio. During the neutral condition two of the torque transmitting devices can be engaged. The truth table shown in FIG. 8 describes the engagement combinations for the various transmission operating conditions.

The simple planetary gear set 218 includes a sun gear member 234, a ring gear member 236 and a planetary carrier assembly member 238, which is comprised of a housing or spider 240 rotatably supporting a plurality of pinion gears 242. The pinion gears 242 each mesh with the sun gear member 234 and the ring gear member 236. The ring gear member 236 is continuously drivingly connected with an output shaft 244 through a hub 246. The sun gear member 234 is selectively connectable with an input shaft 248 through the clutch 224. The planetary carrier assembly member 238 is selectively connectable with the input shaft 248 through the clutch 222.

The compound planetary gear set 220 includes a sun gear member 250, a ring gear member 252 and a planetary carrier assembly member 254 which is comprised of a housing or spider 256 rotatably supporting pairs of meshing pinion gears 258 and 260. The pinion gears 258 also mesh with the sun gear member 250 and the pinion gears 260 mesh with the ring gear member 252. The ring gear member 252 is selectively connectable with a transmission housing 262 via the brake 232 and is also selectively connectable with the output shaft 244 via the clutch 228. The sun gear member 250 is continuously drivingly connected with the planetary carrier assembly member 238. The planetary carrier assembly member 254 is selectively connectable with the sun gear member 234 through the clutch 226 and also selectively connectable with the housing 262 via the brake 230.

The neutral condition, the reverse drive ratio and the first forward drive ratio all have the clutch 224 and the brake 230 engaged. However, there is no torque path established with only these two torque transmitting devices engaged. To complete the reverse drive ratio, the brake 232 is engaged to thereby establish the planetary carrier assembly member 238 as a reaction member in the planetary gear set 218. The sun gear member 234 is driven by the input shaft, and the ring gear member 236 and, therefore, output shaft 244 are rotated in a direction opposite to the input shaft. The reverse drive ratio is dependent only on the planetary gear set 218.

To establish the first forward drive ratio from the neutral condition, the clutch 228 is engaged. This connects the ring gear member 252 with the output shaft 244 and the sun gear member 234 is driven by the input. The planetary carrier assembly member 238 and the sun gear member 250 are driven forwardly to cause forward rotation of the ring gear member 252 and ring gear member 236. The first forward ratio is dependent on both planetary gear set 218 and planetary gear set 220. It should be noted that an interchange from reverse to forward and vice versa is accomplished with a single transition interchange.

The second forward drive ratio is established with a single transition interchange from the first drive ratio through the simultaneous engagement of the clutch 222 and disengagement of the clutch 224. The planetary carrier assembly member 254 remains the reaction member and the sun gear member 250 becomes the input member.

To establish the third forward drive ratio, the simultaneous engagement of clutch 224 and disengagement of clutch 228 is occasioned. This places the planetary gear set 218 in a direct drive condition whereby the output shaft 244 and the input shaft 248 are rotated in unison.

The fourth forward drive ratio is accomplished with a single transition interchange from the third forward drive ratio with the simultaneous engagement of clutch 226 and disengagement of clutch 224. This establishes the sun gear member 234 as the reaction member in the planetary gear set 218 and the planetary carrier assembly member 238 is driven by the input shaft 248. The ring gear member 236 is overdriven relative to the input shaft 248. This is the classic overdrive ratio provided by a simple planetary gear set.

The fifth forward drive ratio is provided with a single transition interchange from the fourth forward drive ratio with the simultaneous engagement of brake 232 and disengagement of brake 230. This establishes the ring gear member 252 as a reaction member and the planetary carrier assembly member 238 and sun gear member 250 are driven at the speed of the input shaft 248. The planetary carrier assembly member 254 and the sun gear member 234 are driven in a direction opposite to the input shaft. This contributes a forward speed factor to the ring gear member 236 which is additive to the overdrive ratio normally provided by the planetary gear set 218.

Figure 8:
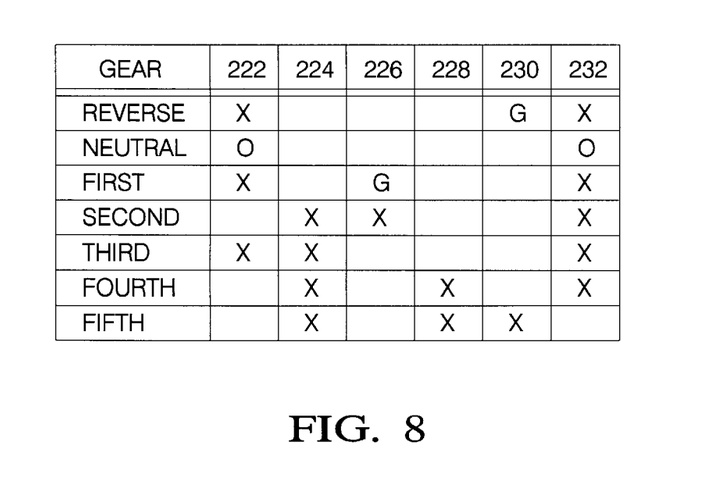
FIG. 8 is a truth table describing the engagement schedule of the friction devices used with the arrangement of FIG. 7.
Figure 9:
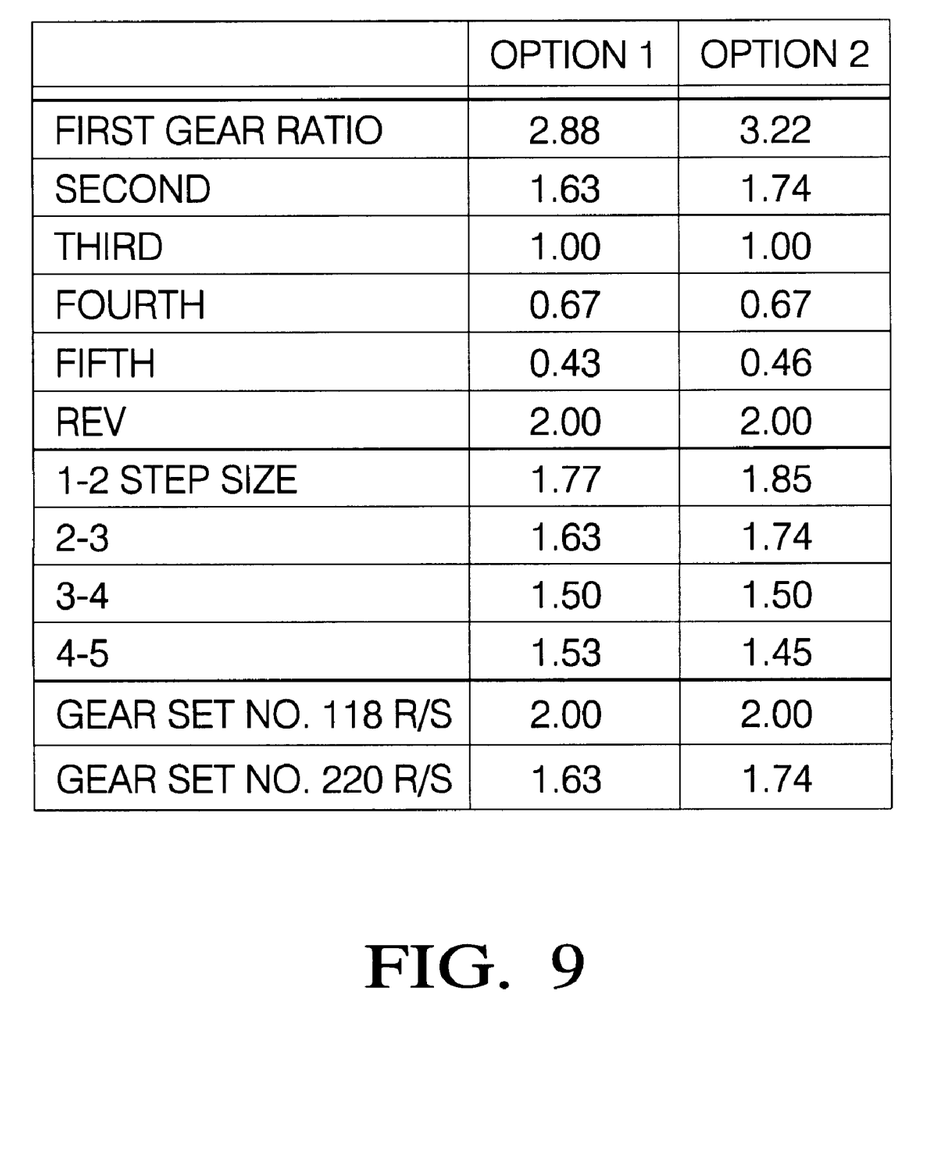
FIG. 9 is a chart of the ratios and step sizes attainable with various ring gear to sun gear tooth ratios in the two gear sets.

As set forth above, the truth table of FIG. 8 describes the engagement schedule for the powertrain 210. From the table it can be ascertained that the single range upshifts and down shifts are of the single transition variety. It should also be noted that a fourth to second interchange and a third to first interchange are also single transition interchanges. The chart in FIG. 9 defines the various ratios and step sizes for the planetary gear arrangement 212 when the ring gear/sun gear ratios of the simple planetary gear set 218 and compound planetary gear set 220 are as shown. It should be noted that the reverse ratio is the same as the ring gear member 236/sun gear member 234 ratio. It can also be shown that the fourth gear ratio is also dependant only on the ratio of the planetary gear set 218.

We claim:

1. A five speed planetary transmission comprising:
    an input means for receiving power from a power source;
    an output means for delivering power to a vehicle drive mechanism;
    a plurality of selectively engageable torque transmitting means comprising four clutches and two brakes;
    a simple planetary gear set including a first sun gear member, a first ring gear member and a first planetary carrier assembly member;
    a first of said clutches being selectively engageable to connect said first sun gear member with said input means;
    a second of said clutches being selectively engageable to connect said first planetary carrier assembly member directly with said input means without engagement of another of said torque transmitting means;
    said first ring gear member being continuously drivingly connected with said output means;
    a compound planetary gear set including a second sun gear member, a second ring gear member and a second planetary carrier assembly member;
    a third of said clutches being selectively engageable to connect said second ring gear member with one of said first ring gear member and said first planetary carrier assembly member;
    a fourth of said clutches being selectively engageable to connect said second planetary carrier assembly member to one of said input means and said first sun gear member;
    one member of said simple planetary gear set being continuously drivingly connected with one member of said compound planetary gear set and selectively connectable to said input means by one of said first clutch and said second clutch;
    said second planetary carrier assembly member being selectively restrained from rotation by a first of said brakes;
    said second ring gear member being selectively restrained from rotation by a second of said brakes; and
    said torque transmitting means being selectively engaged in combinations of three to provide a reverse drive ratio and five forward drive ratios.

2. The five speed planetary transmission defined in claim 1 wherein two of said torque transmitting means are engaged in each said reverse drive ratio, a first of said forward drive ratios, and a neutral condition.

3. The five speed planetary transmission defined in claim 1 further wherein one of said clutches is engaged during at least the four highest of said forward drive ratios.

4. The five speed planetary transmission defined in claim 1 further wherein one of said clutches is engaged during each said reverse drive ratio, a neutral condition, and at least two of said forward drive ratios; and one of said brakes is engaged during each the reverse drive ratio and the highest of the forward drive ratios.

5. The five speed planetary transmission defined in claim 1 further wherein one of said brakes is engaged during each the reverse drive ratio, a neutral condition, and four of the forward drive ratios exclusive of the highest of the forward drive ratios.

6. A five speed planetary transmission comprising:

an input means for receiving power from a power source;

an output means for delivering power to a vehicle drive mechanism;

a plurality of selectively engageable torque transmitting means comprising four clutches and two brakes;

a simple planetary gear set including a first sun gear member, a first ring gear member and a first planetary carrier assembly member;

a first of said clutches being selectively engageable to connect said first sun gear member with said input means;

a second of said clutches being selectively engageable to connect said first planetary carrier assembly member directly with said input means without engagement of another of the torque transmitting means;

said first ring gear member being continuously drivingly connected with said output means;

a compound planetary gear set including a second sun gear member, a second ring gear member and a second planetary carrier assembly member;

a third of said clutches being selectively engageable to connect said second ring gear member with said first planetary carrier assembly member;

a fourth of said clutches being selectively engageable to connect said second planetary carrier assembly member to said input means;

said first sun gear member of said simple planetary gear set being continuously drivingly connected with one of said second sun gear member and said second planetary carrier assembly member and selectively connectable to said input means by one of said first clutch and said second clutch;

said second planetary carrier assembly member being selectively restrained from rotation by a first of said brakes;

said second ring gear member being selectively restrained from rotation by a second of said brakes; and said torque transmitting means being selectively engaged in combinations of three to provide a reverse drive ratio and five forward drive ratios.

7. The five speed planetary transmission defined in claim 6 further wherein one of said clutches is engaged during each said reverse drive ratio, a neutral condition, and at least two of said forward drive ratios; and one of said brakes is engaged during each the reverse drive ratio and the highest of the forward drive ratios.

8. The five speed planetary transmission defined in claim 6 further wherein one of said clutches is engaged during at least the four highest of said forward drive ratios.

9. The five speed planetary transmission defined in claim 6 wherein two of said torque transmitting means are engaged in each said reverse drive ratio, two of said forward drive ratios including the lowest of the forward drive ratios, and a neutral condition.

10. The five speed planetary transmission defined in claim 9 further wherein one of said two torque transmitting means is one of said four clutches which is also engaged during a second forward drive ratio one step above the lowest of said forward drive ratios.

* * * * *